United States Patent
Ohori et al.

(10) Patent No.: US 12,407,291 B2
(45) Date of Patent: Sep. 2, 2025

(54) MOTOR CONTROL DEVICE, MOTOR DEVICE, WIPER DEVICE, AND MOTOR CONTROL METHOD

(71) Applicant: MITSUBA Corporation, Gunma (JP)

(72) Inventors: Ryo Ohori, Gunma (JP); Toshiyuki Amagasa, Gunma (JP); Masahiro Yamada, Gunma (JP); Atsushi Mochida, Gunma (JP); Tamotsu Iwazaki, Gunma (JP)

(73) Assignee: MITSUBA Corporation, Gunma (JP)

( * ) Notice: Subject to any disclaimer, the term of this patent is extended or adjusted under 35 U.S.C. 154(b) by 159 days.

(21) Appl. No.: 18/337,035

(22) Filed: Jun. 18, 2023

(65) Prior Publication Data

US 2024/0106377 A1 Mar. 28, 2024

(30) Foreign Application Priority Data

Sep. 27, 2022 (JP) ................. 2022-153220

(51) Int. Cl.
*H02P 27/08* (2006.01)
*B60S 1/08* (2006.01)
*H02P 25/03* (2016.01)

(52) U.S. Cl.
CPC .......... *H02P 27/085* (2013.01); *B60S 1/0896* (2013.01)

(58) Field of Classification Search
CPC .......... B60S 1/0896; B60S 1/08; H02P 27/08; H02P 25/03; H02P 6/153

USPC ........................................... 318/465
See application file for complete search history.

(56) References Cited

U.S. PATENT DOCUMENTS

| | | | | |
|---|---|---|---|---|
| 10,886,863 | B2 * | 1/2021 | Aoki | H02P 6/12 |
| 11,114,961 | B2 * | 9/2021 | Kaidu | H02P 6/20 |
| 2013/0221881 | A1 * | 8/2013 | Tsuchihashi | H02P 6/14 |
| | | | | 318/400.09 |
| 2018/0183361 | A1 * | 6/2018 | Kadoya | H02P 3/12 |
| 2018/0183368 | A1 * | 6/2018 | Murakami | H02P 6/185 |
| 2019/0047517 | A1 * | 2/2019 | Kojima | B60S 1/0896 |

FOREIGN PATENT DOCUMENTS

JP 2020048401 3/2020

* cited by examiner

*Primary Examiner* — Gabriel Agared
(74) *Attorney, Agent, or Firm* — JCIPRNET

(57) ABSTRACT

A motor control device which controls a motor having an output shaft includes a vehicle speed detection part and a driving control part. The vehicle speed detection part detects a vehicle speed, which is a traveling speed of a vehicle mounted with the motor. Based on the vehicle speed detected by the vehicle speed detection part, the driving control part performs control of switching between a first driving mode which drives the motor, and a second driving mode in which a number of revolutions of the output shaft and an output of the motor are higher than in the first driving mode.

7 Claims, 12 Drawing Sheets

FIG. 3

| Switching element | | Stage 1 | | | Stage 2 | | | Stage 3 | | | Stage 4 | | | Stage 5 | | | Stage 6 | | |
|---|---|---|---|---|---|---|---|---|---|---|---|---|---|---|---|---|---|---|---|
| | | A' | B' | C' | A' | B' | C' | A' | B' | C' | A' | B' | C' | A' | B' | C' | A' | B' | C' |
| U | H | 1 | 1 | 0 | 0 | P | P | P | P | P | P | P | 0 | 0 | 1 | 1 | 1 | 1 | 1 |
| U | L | 0 | 0 | 0 | 0 | P | P | P | P | P | P | P | 0 | 0 | 0 | 0 | 0 | 0 | 0 |
| V | H | P | P | P | P | P | 0 | 0 | 1 | 1 | 1 | 1 | 1 | 1 | 1 | 0 | 0 | P | P |
| V | L | P | P | P | P | P | 0 | 0 | 0 | 0 | 0 | 0 | 0 | 0 | 0 | 0 | 0 | P | P |
| W | H | 0 | 1 | 1 | 1 | 1 | 1 | 1 | 1 | 0 | 0 | P | P | P | P | P | P | P | 0 |
| W | L | 0 | 0 | 0 | 0 | 0 | 0 | 0 | 0 | 0 | 0 | P | P | P | P | P | P | P | 0 |

| Switching element | | Stage | | | | | | | | | | | | | | | | | |
|---|---|---|---|---|---|---|---|---|---|---|---|---|---|---|---|---|---|---|---|
| | | 1 | | | 2 | | | 3 | | | 4 | | | 5 | | | 6 | | |
| | | A | B | C | A | B | C | A | B | C | A | B | C | A | B | C | A | B | C |
| U | H | PL | PL | PM | PM | PS | PS | PS | PS | PS | PS | PS | PM | PM | PL | PL | PL | PL | PL |
| | L | PL | PS | PM | PM | PS | PM | PS | PL | PL | PS | PL | PM | PM | PL | PL | PL | PL | PL |
| V | H | PS | PS | PS | PS | PL | PM | PM | PL | PL | PL | PL | PL | PL | PL | PL | PM | PS | PS |
| | L | PS | PS | PL | PL | PL | PL | PL | PL | PL | PL | PL | PL | PL | PL | PM | PS | PS | PS |
| W | H | PM | PL | PL | PL | PL | PL | PL | PL | PM | PS | PS | PS | PS | PS | PS | PS | PS | PM |
| | L | PM | PL | PL | PL | PL | PL | PL | PL | PM | PS | PS | PM | PS | PS | PS | PS | PS | PM |

| Switching element | | | Stage | | | | | | | | | | | | | | | | | | |
|---|---|---|---|---|---|---|---|---|---|---|---|---|---|---|---|---|---|---|---|---|---|
| | | | 1 | | | 2 | | | 3 | | | 4 | | | 5 | | | 6 | | | |
| | | | A″ | B″ | C″ | A″ | B″ | C″ | A″ | B″ | C″ | A″ | B″ | C″ | A″ | B″ | C″ | A″ | B″ | C″ |
| U | H | 1 | 1 | P2 | P2 | P1 | P1 | P1 | P1 | P1 | P1 | P1 | P2 | P2 | P1 | P2 | 1 | 1 | 1 |
| | L | 0 | 0 | P2 | P2 | P1 | P1 | P1 | P1 | P1 | P1 | P1 | P2 | P2 | P1 | P2 | 0 | 0 | 0 |
| V | H | P1 | P1 | P1 | P1 | P1 | P1 | 1 | 1 | 1 | 1 | 1 | 1 | P1 | 0 | P2 | P1 | P1 | P1 |
| | L | P1 | P1 | P1 | P1 | P1 | P1 | 0 | 0 | 0 | 0 | 0 | 0 | P1 | 1 | P2 | P1 | P1 | P1 |
| W | H | P2 | 1 | P2 | 1 | P1 | P1 | P2 | P1 | P2 | P1 | P1 | P1 | P1 | P1 | P1 | P1 | P1 | P2 |
| | L | P2 | 0 | P2 | 0 | P1 | P1 | P2 | P1 | P2 | P1 | P1 | P1 | P1 | P1 | P1 | P1 | P1 | P2 |

MOTOR CONTROL DEVICE, MOTOR DEVICE, WIPER DEVICE, AND MOTOR CONTROL METHOD

CROSS-REFERENCE TO RELATED APPLICATION

This application claims the priority benefit of Japan application serial no. 2022-153220, filed on Sep. 27, 2022. The entirety of the above-mentioned patent application is hereby incorporated by reference herein and made a part of this specification.

BACKGROUND

Technical Field

The disclosure relates to a motor control device, a motor device, a wiper device, and a motor control method.

Related Art

In recent years, in motor control, motor control devices that switch between different driving modes, such as a non-free driving mode and a rectangular wave driving mode, according to a load magnitude have been known (e.g., see Patent Document 1: Japanese Patent Application Laid-Open No. 2020-48401). Herein, the non-free driving mode is a driving mode that outputs one half of the duty in the OFF phase (corresponding to a phase open period, hereinafter also referred to as a free phase) among three phases, and the non-free driving mode is a low-output driving mode in which the number of revolutions decreases compared to the rectangular wave driving mode in the case of driving at the same power. In Patent Document 1, the switching control on the driving mode is performed based on a load integrated value, which is a value determined according to a load and is obtained by integrating the load.

In the driving of a motor mounted on a vehicle, such as a wiper device, a high load may be generated from an initial stage of driving, for example, during vehicle traveling. However, in the motor control device as described above, in the case where a high load is generated from an initial stage of driving, since the load has not yet been integrated, the driving mode may be switched to a low-output driving mode such as the non-free driving mode, and there is a possibility that motor driving may stop halfway.

SUMMARY

An aspect of the disclosure is a motor control device which controls a motor having an output shaft. The motor control device includes a vehicle speed detection part and a driving control part. The vehicle speed detection part detects a vehicle speed, which is a traveling speed of a vehicle mounted with the motor. Based on the vehicle speed detected by the vehicle speed detection part, the driving control part performs control of switching between a first driving mode which drives the motor, and a second driving mode in which a number of revolutions of the output shaft and an output of the motor are higher than in the first driving mode.

Further, an aspect of the disclosure is a motor control method which controls a motor having an output shaft. The motor control method includes a vehicle speed detection step and a driving control step. In the vehicle speed detection step, a vehicle speed detection part detects a vehicle speed, which is a traveling speed of a vehicle mounted with the motor. In the driving control step, based on the vehicle speed detected in the vehicle speed detection step, a driving control part performs control of switching between a first driving mode which drives the motor, and a second driving mode in which a number of revolutions of the output shaft and an output of the motor are higher than in the first driving mode.

According to the embodiments of the disclosure, it is possible to appropriately perform motor driving even in the case where a high load is generated from an initial stage of motor driving.

BRIEF DESCRIPTION OF THE DRAWINGS

FIG. 3 is a table summarizing an example of the rectangular wave driving patterns in this embodiment.

FIG. 5 is a table summarizing the first example of the non-free driving patterns in this embodiment.

FIG. 7 is a table summarizing the second example of the non-free driving patterns in this embodiment.

DESCRIPTION OF THE EMBODIMENTS

Embodiments of the disclosure provide a motor control device, a motor device, a wiper device, and a motor control method capable of appropriately performing motor driving even in the case where a high load is generated from an initial stage of motor driving.

Hereinafter, a motor control device, a motor device, a wiper device, and a motor control method according to an embodiment of the disclosure will be described with reference to the drawings.

Figure 1:
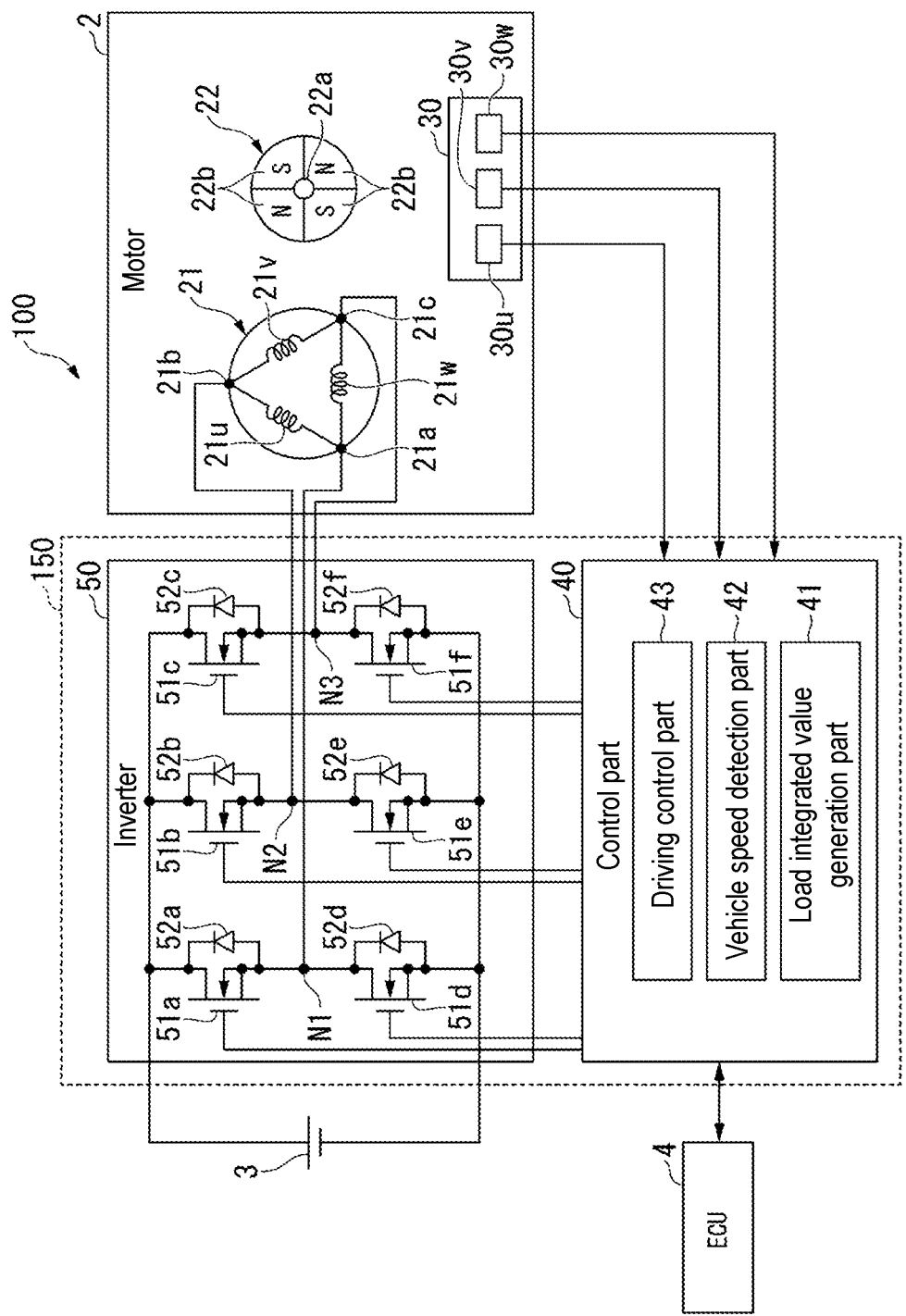
FIG. 1 is a block diagram showing an example of a motor device according to this embodiment.

FIG. 1 is a block diagram showing an example of a motor device 100 according to this embodiment. As shown in FIG. 1, the motor device 100 includes a motor 2, a control part 40, and an inverter 50. The motor device 100 according to this embodiment is, for example, used in a wiper device that wipes a window glass of a vehicle.

In this embodiment, the control part 40 and the inverter 50 are compatible with a motor control device 150. Further, a battery 3 and an engine control unit (ECU) 4 are connected to the motor control device 150.

The motor 2 is, for example, a three-phase four-pole brushless motor. The motor 2 rotates and drives according to an output signal (applied voltage) outputted by the inverter 50 based on a driving signal to be described later. Further, the motor 2 includes a stator 21 and a rotor 22.

The stator 21 is fixed to an inner circumference of a case of the motor 2. The stator 21 includes windings (21u, 21v, 21w) of three phases. The stator 21 is wound with the windings (21u, 21v, 21w). For example, the windings (21u, 21v, 21w) of three phases are connected in a delta connection configuration.

In the delta connection configuration, the winding 21u and the winding 21w are connected by a connection point 21a, the winding 21v and the winding 21w are connected by a connection point 21c, and the winding 21u and the winding 21v are connected by a connection point 21b.

The rotor 22 is provided on the inner side of the stator 21. The rotor 22 includes, for example, a rotor shaft 22a and a four-pole permanent magnet 22b attached to the rotor shaft 22a. A plurality of bearings (not shown) are provided in the case of the motor 2, and the rotor shaft 22a is rotatably supported by the plurality of bearings.

A position detection part 30 detects a signal corresponding to rotation of the rotor 22. The position detection part 30 includes, for example, three Hall elements (30u, 30v, 30w). Upon rotation of the rotor 22, the three Hall elements (30u, 30v, 30w) output pulse signals, which are 120 degrees phase-shifted with respect to each other, to the control part 40. That is, the position detection part 30 generates pulse signals based on changes in the magnetic pole of a sensor magnet (not shown) arranged at the rotor shaft 22a as the rotor 22 rotates, and outputs the pulse signals to the control part 40. Each of the Hall element (30u, 30v, 30w) detects a position shifted by 120 degrees in electrical angle.

In this embodiment, the Hall element 30u outputs a digital signal (position detection signal Hu) corresponding to the U-phase, the Hall element 30v outputs a digital signal (position detection signal Hv) corresponding to the V-phase, and the Hall element 30w outputs a digital signal (position detection signal Hw) corresponding to the W-phase. In this embodiment, the three Hall elements (30u, 30v, 30w) are arranged with respect to the rotor 22 in such a manner that an advance angle of 30 degrees in electrical angle is obtained in the case where the output of the inverter 50 is changed immediately at each position at which the level of the output signal of the three Hall elements (30u, 30v, 30w) changes, i.e., at each position at which an edge occurs in the output signal.

Based on a driving signal generated by the driving control part 43 (to be described later), the inverter 50 is subjected to, for example, pulse width modulation (PWM) control and applies a voltage to the windings (21u, 21v, 21w) of three phases of the motor 2. That is, based on the driving signal generated by the driving control part 43, the inverter 50 causes switching elements (51a to 51f) to perform a switching operation (conduction/non-conduction) to change an output magnitude (duty ratio), an energization period (energization angle), and an energization timing (advance angle) of the voltage applied to the motor 2. Herein, the duty ratio represents a ratio of a conduction period of the corresponding switching element in a PWM cycle.

The inverter 50 generates an applied voltage with a direct current power supplied from the battery 3. The battery 3 is, for example, a direct current power supply such as a lead-acid battery or a lithium-ion battery and supplies power that drives the motor 2.

The inverter 50 includes six switching elements 51a to 51f connected in a three-phase bridge, and diodes 52a to 52f. The switching elements 51a to 51f are, for example, N-channel metal oxide semiconductor field effect transistors (MOSFET) and constitute a three-phase bridge circuit.

The switching element 51a and the switching element 51d are connected in series between a positive electrode terminal and a negative electrode terminal of the battery 3 and constitute a U-phase bridge circuit. The switching element 51a has a drain terminal connected to the positive electrode terminal of the battery 3, a source terminal connected to a node N1, and a gate terminal connected to a signal line of an upper-side driving signal of the U-phase. Further, the switching element 51d has a drain terminal connected to the node N1, a source terminal connected to the negative electrode terminal of the battery 3, and a gate terminal connected to a signal line of a lower-side driving signal of the U-phase. Further, the node N1 is connected to the connection point 21a of the motor 2.

The switching element 51b and the switching element 51e are connected in series between the positive electrode terminal and the negative electrode terminal of the battery 3 and constitute a V-phase bridge circuit. The switching element 51b has a drain terminal connected to the positive electrode terminal of the battery 3, a source terminal connected to a node N2, and a gate terminal connected to a signal line of an upper-side driving signal of the V-phase. Further, the switching element 51e has a drain terminal connected to the node N2, a source terminal connected to the negative electrode terminal of the battery 3, and a gate terminal connected to a signal line of a lower-side driving signal of the V-phase. Further, the node N2 is connected to the connection point 21b of the motor 2.

The switching element 51c and the switching element 51f are connected in series between the positive electrode terminal and the negative electrode terminal of the battery 3 and constitute a W-phase bridge circuit. The switching element 51c has a drain terminal connected to the positive electrode terminal of the battery 3, a source terminal connected to a node N3, and a gate terminal connected to a signal line of an upper-side driving signal of the W-phase. Further, the switching element 51f has a drain terminal connected to the node N3, a source terminal connected to the negative electrode terminal of the battery 3, and a gate terminal connected to a signal line of a lower-side driving signal of the W-phase. Further, the node N3 is connected to the connection point 21c of the motor 2.

Further, the diode 52a has an anode terminal connected to the node N1 and a cathode terminal connected to the positive electrode terminal of the battery 3. Further, the diode 52d has an anode terminal connected to the negative electrode terminal of the battery 3 and a cathode terminal connected to the node N1.

Further, the diode 52b has an anode terminal connected to the node N2 and a cathode terminal connected to the positive electrode terminal of the battery 3. Further, the diode 52e has an anode terminal connected to the negative electrode terminal of the battery 3 and a cathode terminal connected to the node N2.

Further, the diode 52c has an anode terminal connected to the node N3 and a cathode terminal connected to the positive electrode terminal of the battery 3. Further, the diode 52f has an anode terminal connected to the negative electrode terminal of the battery 3 and a cathode terminal connected to the node N3.

The control part 40 is, for example, a processor including a central processing unit (CPU) and comprehensively controls the motor device 100. The control part 40 generates a driving signal corresponding to a target rotation output (e.g., target number of revolutions TRPM) of the rotor 22 and outputs the generated driving signal to the inverter 50. The control part 40 transmits and receives predetermined information to and from the ECU 4 and the motor 2. Further, the control part 40 includes a load integrated value generation part 41, a vehicle speed detection part 42, and a driving control part 43.

The load integrated value generation part 41 executes a high load detection process of the rotor 22 based on a set rotational speed (number of revolutions) of the rotor 22 and a duty ratio. The load integrated value generation part 41 calculates and accumulates a load point value from the motor speed (rotational speed of the rotor 22) and the duty ratio, and generates an accumulated point value (load integrated value). The rotational speed of the rotor 22 is detected based on the output signals of the three Hall elements (30u, 30v, 30w).

For example, referring to a load point map (not shown) that associates a motor speed, a duty ratio, and a power supply voltage with a load point value, the load integrated value generation part 41 acquires the load point value corresponding to the motor speed, the duty ratio, and the power supply voltage. The load integrated value generation part 41 integrates the acquired load point values and generates an accumulated point value as a load integrated value.

As a high load state continues, since the "+" (positive) load point value continues, the accumulated point value (load integrated value) becomes a large positive value. On the other hand, as a normal load or a light load state continues, since the "0" or "−" (negative) load point value continues, the accumulated point value becomes "0" or less. Herein, the accumulated point value is all set to "0" in the case of "0" or less, and the accumulated point value indicates "0" when the motor 2 is operating normally. Further, once in the high load state, in the case where the load is subsequently reduced to a controllable region, the accumulated load point value is gradually subtracted and eventually converges to "0" or a small positive value. Thus, by looking at the accumulated point value, it is possible to learn the current status of the motor 2 and determine it as a high load in the case where the value exceeds a specific level. In this manner, the accumulated point value (load integrated value) serves as an index value of the load on the motor 2, and the control part 40 uses the accumulated point value (load integrated value) in the control on motor driving.

The vehicle speed detection part 42 detects a vehicle speed, which is a traveling speed of the vehicle mounted with the motor 2. The vehicle speed detection part 42 detects the vehicle speed based on a vehicle speed signal outputted from the ECU 4.

The driving control part 43 generates a driving signal corresponding to a target rotation output (e.g., target number of revolutions TRPM) of the rotor 22 and outputs the generated driving signal to the inverter 50. The driving control part 43, for example, switches between a rectangular wave driving mode (an example of a second driving mode) and a non-free driving mode (an example of a first driving mode) to control driving of the motor 2. The rectangular wave driving mode is a high-output driving mode in which a minimum rotational speed at which the rotor shaft 22a can be rotationally driven by the inputted power is higher than that in the non-free driving mode. Herein, referring to FIG. 2 to FIG. 7, details of the rectangular wave driving mode and the non-free driving mode will be described.

Figure 2:
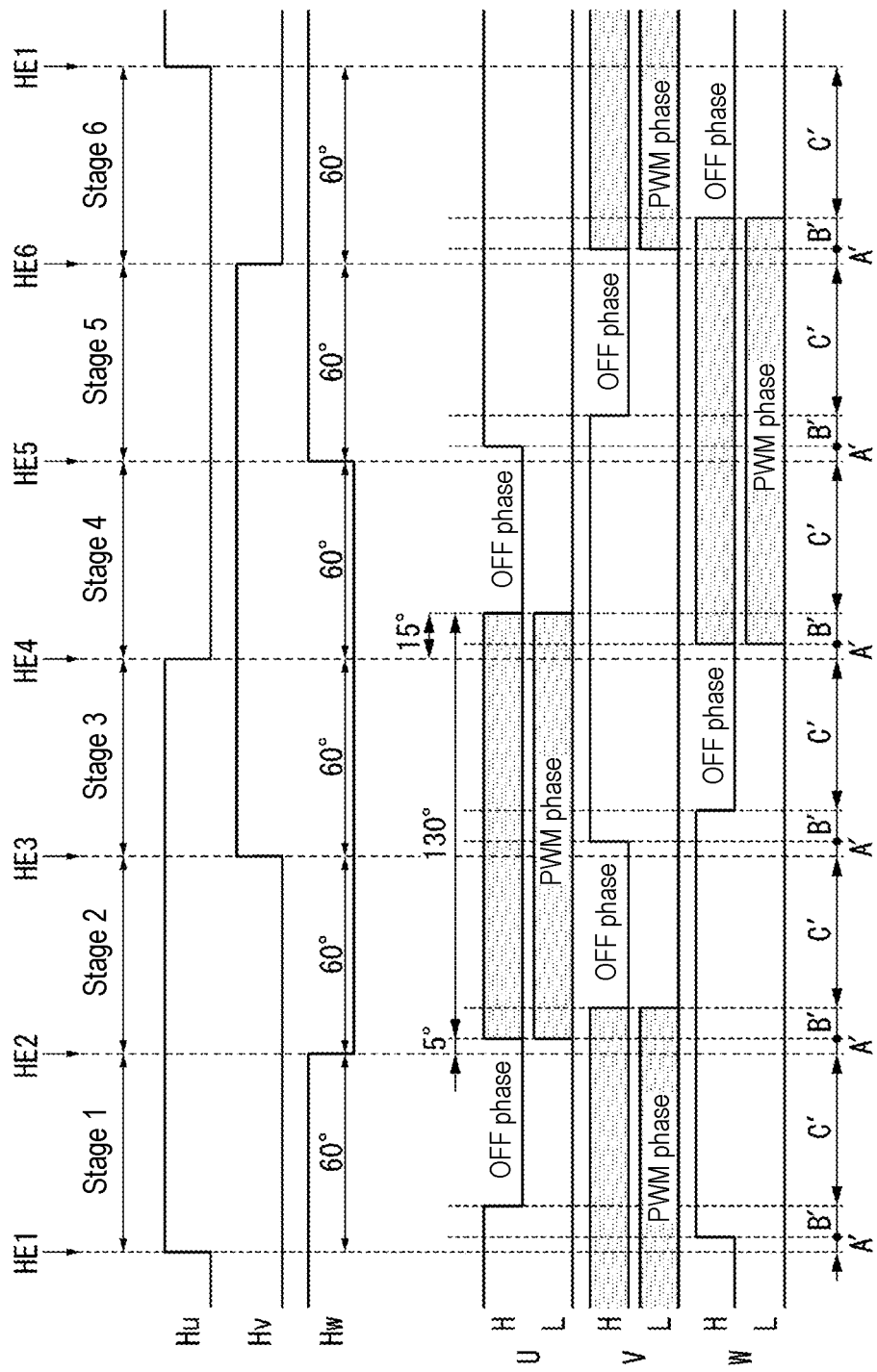
FIG. 2 is a diagram showing an example of rectangular wave driving patterns in this embodiment.
Figure 4:
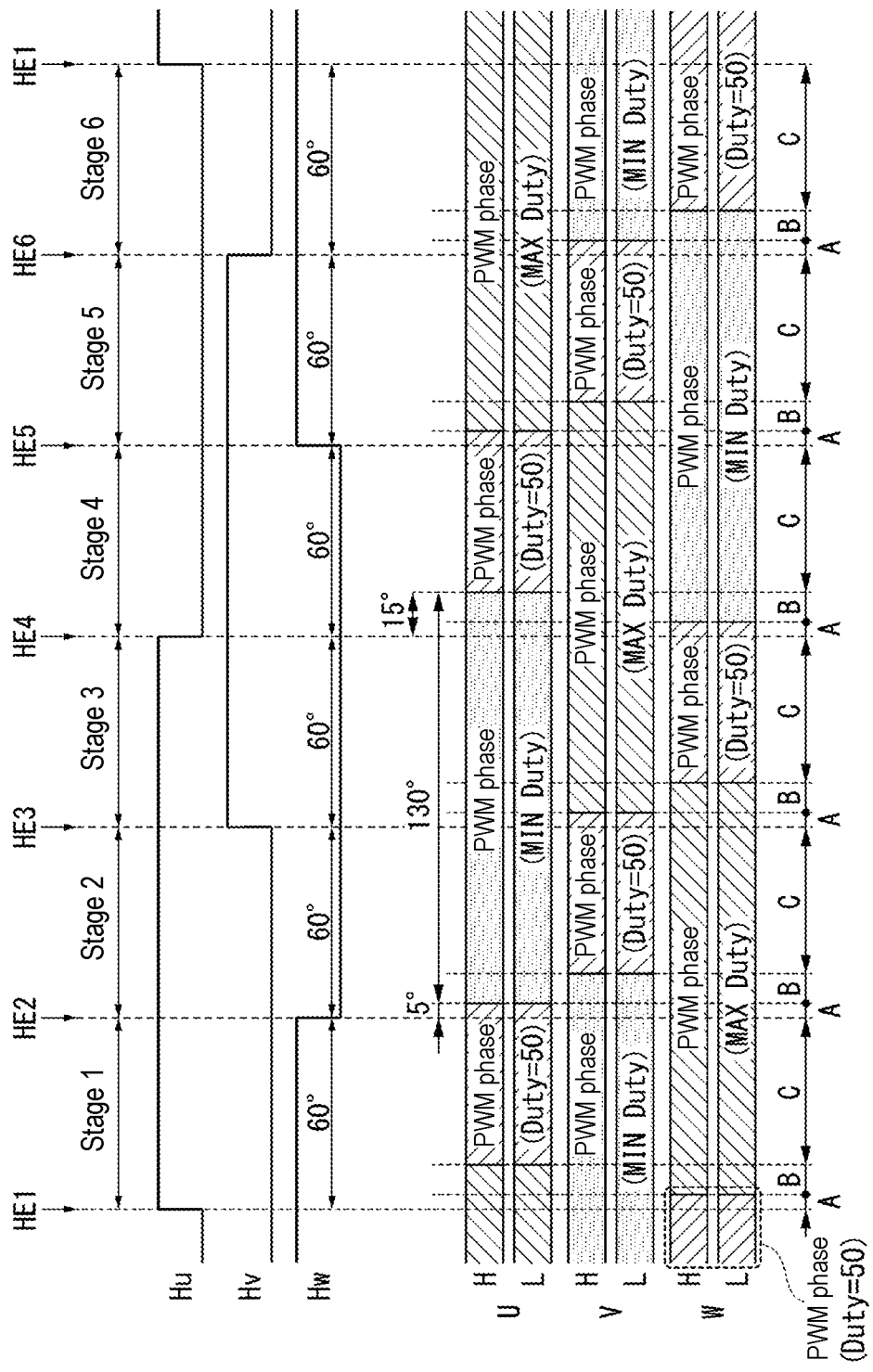
FIG. 4 is a diagram showing a first example of non-free driving patterns in this embodiment.
Figure 6:
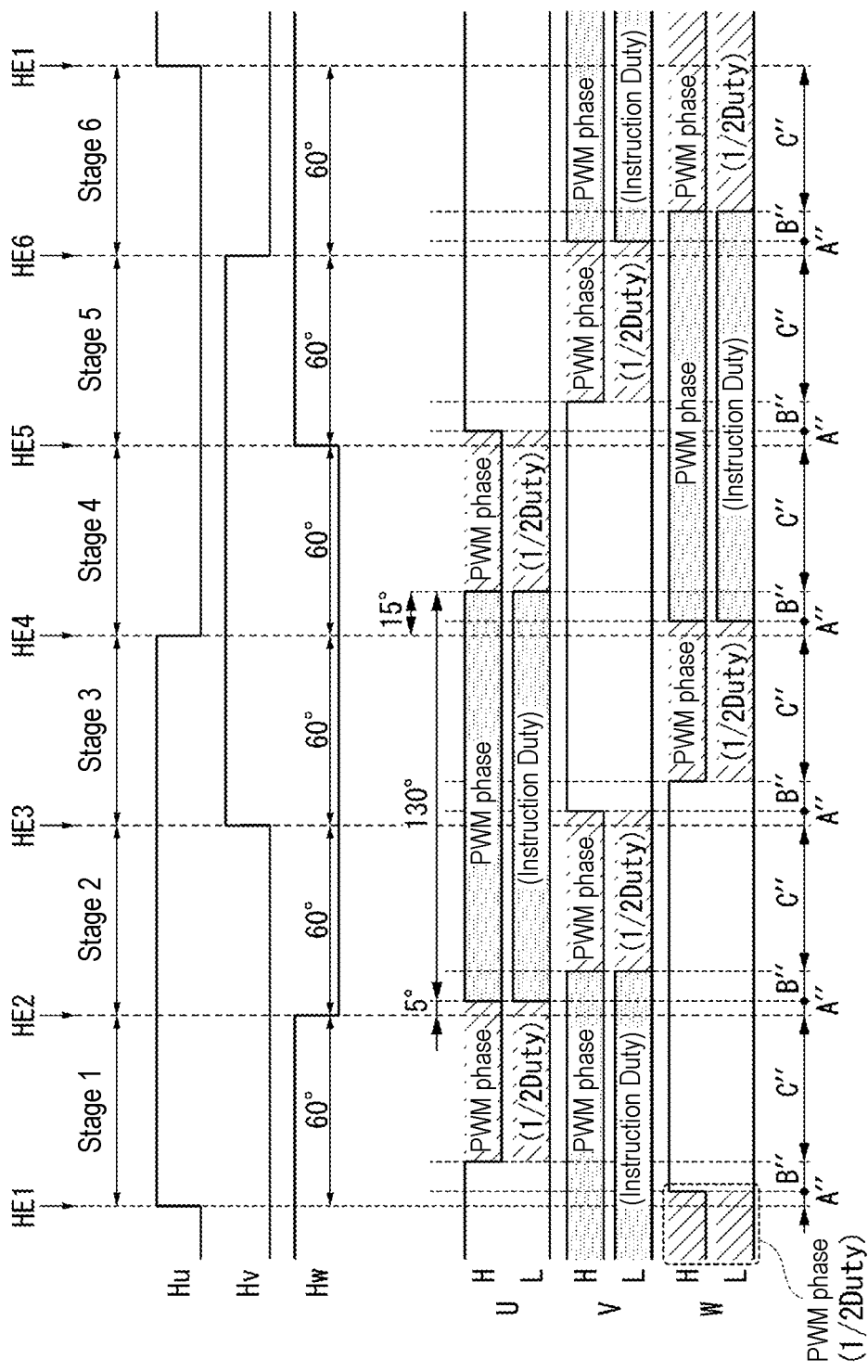
FIG. 6 is a diagram showing a second example of the non-free driving patterns in this embodiment.

FIG. 2, FIG. 4, and FIG. 6 are diagrams for illustrating an example of the position detection signals (Hu, Hv, Hw) outputted by the Hall elements (30u, 30v, 30w) and advance angles and energization angles in energization control of the inverter 50. FIG. 2, FIG. 4, and FIG. 6 show the correspondence between the position detection signals (Hu, Hv, Hw) and angular regions in which the switching elements 51a to 51f are turned on. The horizontal axis represents the rotational position of the magnetic pole of the rotor 22 of the motor 2 in electrical angle.

The position detection signals (Hu, Hv, Hw) have a phase difference of 120 degrees from each other with an electrical angle of 360 degrees being one cycle, and change to an H state (high state) or an L state (low state) every 180 degrees. In this embodiment, the change of the position detection signal Hu from the L state to the H state is referred to as a Hall edge HE1, and the change from the H state to the L state is referred to as a Hall edge HE4. Further, the change of the position detection signal Hv from the L state to the H state is referred to as a Hall edge HE3, and the change from the H state to the L state is referred to as a Hall edge HE6. Further, the change of the position detection signal Hw from the L state to the H state is referred to as a Hall edge HE5, and the change from the H state to the L state is referred to as a Hall edge HE2.

Assuming that the position detection signals (Hu, Hv, Hw) outputted by the Hall elements (30u, 30v, 30w) do not contain errors, the electrical angle between the respective Hall edges is 60 degrees. Further, the region between the Hall edge HE1 and the Hall edge HE2 is referred to as a Hall stage 1 (hereinafter simply referred to as a stage 1 (the same applies hereinafter)), the region between the Hall edge HE2 and the Hall edge HE3 is referred to as a stage 2, and the region between the Hall edge HE3 and the Hall edge HE4 is referred to as a stage 3. Further, the region between the Hall edge HE4 and the Hall edge HE5 is referred to as a stage 4, the region between the Hall edge HE5 and the Hall edge HE6 is referred to as a stage 5, and the region between the Hall edge HE6 and the Hall edge HE1 is referred to as a stage 6.

FIG. 2 is a diagram showing an example of rectangular wave driving patterns in this embodiment. FIG. 2 is a diagram showing the correspondence between the position detection signals (Hu, Hv, Hw) and energization patterns of the respective switching element 51a to 51f, with the horizontal axis representing the electrical angle. The example of energization control shown in FIG. 2 is the case where the advance angle is 20 degrees and the energization angle is 130 degrees.

The energization pattern is a combination of any of states of the respective switching element 51a to 51f, including a state of being continuously turned on ("ON"), a state of being continuously turned off ("OFF") (period other than "ON" or "PWM", also referred to as a free phase period), and a state of being controlled to be turned on or off at a specific cycle (PWM-controlled state) ("PWM"). Each of the stages 1 to 6 is further divided into three sections including a section A', a section B', and a section C'. An energization pattern is set individually for each of the section A', the section B', and the section C'. The period (electrical angle) of each of the section A', the section B', and the section C' changes according to the value of the advance angle and the value of the energization angle.

For example, in the stage 1 defined between the Hall edge HE1 and the Hall edge HE2, the energization pattern of the section A' is a combination of the states of the switching elements 51a to 51f being "ON", "OFF", "PWM", "PWM", "OFF", and "OFF", respectively. Further, the energization pattern of the section B' is a combination of the states of the switching elements 51a to 51f being "ON", "OFF", "PWM", "PWM", "ON", and "OFF", respectively. Further, the energization pattern of the section C' is a combination of the states of the switching elements 51*a* to 51*f* being "OFF", "OFF", "PWM", "PWM", "ON", and "OFF", respectively.

Further, FIG. 3 is a table summarizing an example of the rectangular wave energization patterns in this embodiment shown in FIG. 2. A ROM (not shown) in the control part 40, for example, stores the rectangular wave energization patterns in a format as shown in FIG. 3. In FIG. 3, "1" represents "ON", "0" represents "OFF", and "P" represents "PWM".

As described above, the combination defining the rectangular wave energization pattern includes three states (1) to (3) below.

(1) First state: The switching element 51*a* to 51*f* is continuously turned on ("ON").

(2) Second state: The switching element 51*a* to 51*f* is continuously turned off ("OFF") (period other than "ON" or "PWM").

(3) Third state: The switching element 51*a* to 51*f* is controlled to be turned on or off at a specific cycle (PWM-controlled state) ("PWM").

Thus, in the rectangular wave driving mode, the driving control part 43 controls conduction (energization) of the switching elements 51*a* to 51*f* according to the rectangular wave energization patterns above.

Next, referring to FIG. 4 to FIG. 7, the non-free driving mode will be described. There are two methods for controlling a non-free energization pattern used in the non-free driving mode.

In a first method of non-free energization, a duty ratio of a PWM signal for the switching element connected to a coil of one phase among the three phases is set to an intermediate value between duty ratios of respective PWM signals for the switching elements connected to coils of the other two phases.

In a second method of non-free energization, the duty ratio of the PWM signal for the switching element connected to the coil of one phase among the three phases is set to one half of an instruction duty ratio inputted from outside, and the duty ratios of the respective PWM signals for the switching elements connected to the coils of the other two phases are respectively set to the same value as the instruction duty ratio and 100%.

<First Method of Non-Free Energization>

In the driving and energization based on the non-free energization pattern using the first method, the states (1) to (3) above are respectively changed to three states (4) to (6) below.

(4) Fourth state: The first state is changed to a fourth state (hereinafter referred to as a "PL" state) in which PWM control is performed according to a PWM signal with a maximum duty ratio greater than that in the PWM control in the third state.

(5) Fifth state: The third state is changed to a fifth state (hereinafter referred to as a "PS" state) in which PWM control is performed according to a PWM signal with a minimum duty ratio smaller than that in the PWM control in the third state.

(6) Sixth state: The second state is changed to a sixth state (hereinafter referred to as a "PM" state) in which PWM control is performed according to a PWM signal with an intermediate duty ratio between the maximum duty ratio and the minimum duty ratio.

In other words, the timings at which the U-phase, V-phase, and W-phase windings (21*u*, 21*v*, 21*w*) respectively become the PM state (sixth state) in the non-free energization pattern are the same as the timings at which the U-phase, V-phase, and W-phase windings (21*u*, 21*v*, 21*w*) respectively become OFF-phase coils (second state) in the rectangular wave energization pattern.

Thus, it is possible to address the problem that the control circuit (driving control part 43) that drives the switching elements 51*a* to 51*f* malfunctions when a negative voltage is generated at an input terminal of the motor 2 upon switching of the energization pattern from the first state to the second state. Further, even at the timing (phase open period: period of being in the second state) of being free in 120-degree rectangular wave energization, PWM control is performed as in the sixth state, which results in 180-degree energization and a smooth current waveform at the time of commutation, so it becomes possible to expect an effect of quieting a driving sound (reducing motor operation sound).

Herein, in this embodiment, the intermediate duty ratio is 50%. Further, the maximum duty ratio is a duty ratio obtained by adding one half of the instruction duty ratio inputted from outside to the intermediate duty ratio. Further, the minimum duty ratio is a duty ratio obtained by subtracting one half of the instruction duty ratio from the intermediate duty ratio.

For example, in the case where the instruction duty ratio is 80%, since the intermediate duty ratio is preset to 50%, the maximum duty ratio becomes 90% according to (50+80÷2), and the minimum duty ratio becomes 10% according to (50−80÷2). The instruction duty ratio is assumed to be stored in advance to the ROM (not shown) of the control part 40 by a user.

Herein, the switching elements 51*d* to 51*f* on the negative electrode side receive PWM signals that are in reverse phase to the PWM signals inputted to the switching elements 51*a* to 51*c* on the positive electrode side. Thus, the duty ratios of PWM signals that drive a pair of switching elements on the positive electrode side and the negative electrode side differ from each other. However, in this embodiment, the duty ratios of PWM signals that drive the switching elements 51*a* to 51*c* on the positive electrode side are referred to as the duty ratios of PWM signals that drive the pairs of switching elements.

FIG. 4 is a diagram showing an example of non-free energization patterns of the first method. FIG. 4 is a diagram showing the correspondence between the position detection signals (Hu, Hv, Hw) and the energization patterns of the respective switching elements 51*a* to 51*f*, with the horizontal axis representing the electrical angle.

The example of energization control shown in FIG. 4 is the case where the advance angle is 20 degrees and the energization angle is 130 degrees. The energization pattern is a combination of any of states of the respective switching element 51*a* to 51*f*, including a state changed from being continuously turned on ("ON"), i.e., "ON" (first state), to "PL" (fourth state), a state changed from being continuously turned off ("OFF") (period other than "ON" or "PWM"), i.e., "OFF" (second state), to "PM" (sixth state), and a state changed from being controlled to be turned on or off at a specific cycle (PWM-controlled state) ("PWM"), i.e., "PWM" (third state), to "PS" (fifth state).

Each of the stages 1 to 6 is further divided into three sections including a section A, a section B, and a section C. An energization pattern is set individually for each of the section A, the section B, and the section C. The period (electrical angle) of each of the section A, the section B, and the section C changes according to the value of the advance angle and the value of the energization angle.

Since the switching elements 51*a* to 51*f* each repeat "ON" and "OFF" in the PWM-controlled state, the waveform is in fact a rectangular wave shape having projections and indentations. However, for convenience of illustration, in FIG. 4 and FIG. 6 (to be described later), the "ON/OFF" of each of the switching elements 51a to 51f is not specified, but is labeled as "PWM phase". Herein, in FIG. 4, the "PL" state is labeled as "PWM phase (MAX Duty)", the "PS" state is labeled as "PWM phase (MIN Duty)", and the "PM" state is labeled as "PWM phase (Duty=50)".

For example, in the stage 1 defined between the Hall edge HE1 and the Hall edge HE2, the energization pattern of the section A is a combination of the states of the switching elements 51a to 51f being "PL", "PL", "PS", "PS", "PM", and "PM", respectively. Further, the energization pattern of the section B is a combination of the states of the switching elements 51a to 51f being "PL", "PL", "PS", "PS", "PL", and "PL", respectively. Further, the energization pattern of the section C is a combination of the states of the switching elements 51a to 51f being "PM", "PM", "PS", "PS", "PL", and "PL", respectively.

Further, FIG. 5 is a table summarizing an example of the non-free energization patterns of the first method shown in FIG. 4. The ROM (not shown) in the control part 40 stores the non-free energization patterns in a format as shown in FIG. 5, for example. In FIG. 5, "PL" represents the fourth state in which PWM control is performed according to a PWM signal with the maximum duty ratio, "PS" represents the fifth state in which PWM control is performed according to a PWM signal with the minimum duty ratio, and "PM" represents the sixth state in which PWM control is performed according to a PWM signal with the intermediate duty ratio between the maximum duty ratio and the minimum duty ratio. Thus, in the non-free driving mode (first method), the driving control part 43 controls conduction (energization) of the switching elements 51a to 51f according to the non-free energization patterns above.

<Second Method of Non-Free Energization>

In the driving and energization based on the non-free energization pattern using the second method, the states (1) to (3) above are respectively changed to three states (7) to (9) below. In the state (1) and the state (7), since the control on each of the switching elements is the same, actually the state has not changed.

(7) Seventh state: The first state is maintained, and the switching element 51a to 51f is continuously turned on ("ON").

(8) Eighth state: The third state is changed to an eighth state (hereinafter referred to as a "P1" state) in which PWM control is performed according to a PWM signal with the instruction duty ratio inputted from outside.

(9) Ninth state: The second state is changed to a ninth state (hereinafter referred to as a "P2" state) in which PWM control is performed according to a PWM signal with a duty ratio that is one half of the instruction duty ratio inputted from outside.

In other words, the timings at which the U-phase, V-phase, and W-phase windings (21u, 21v, 21w) respectively become the P2 state (ninth state) in the non-free energization pattern are the same as the timings at which the U-phase, V-phase, and W-phase windings (21u, 21v, 21w) respectively become OFF-phase windings (second state) in the rectangular wave energization pattern.

Thus, it is possible to address the problem that the control circuit (control part 40) that drives the switching elements malfunctions when a negative voltage is generated at an input terminal of the motor 2 upon switching of the energization pattern from the first state to the second state. Further, even at the timing (phase open period: period of being in the second state) of being free in 120-degree rectangular wave energization, PWM control is performed as in the ninth state, which results in 180-degree energization and a smooth current waveform at the time of commutation, so it becomes possible to expect an effect of quieting a driving sound (reducing motor operation sound). In other words, similar effects can be expected using the driving and energization method according to the non-free energization pattern of either the first method or the second method.

Herein, in this embodiment, the duty ratio in the seventh state is 100%. For example, in the case where the instruction duty ratio is 80%, the duty ratio in the eighth state becomes 80%, and the duty ratio in the ninth state becomes 40% according to 80÷2. The instruction duty ratio is assumed to be stored in advance to the ROM (not shown) of the control part 40 by the user.

FIG. 6 is a diagram showing an example of the non-free energization patterns of the second method. FIG. 6 is a diagram showing the correspondence between the position detection signals (Hu, Hv, Hw) and the energization patterns of the respective switching elements 51a to 51f, with the horizontal axis representing the electrical angle.

The example of energization control shown in FIG. 6 is the case where the advance angle is 20 degrees and the energization angle is 130 degrees. The energization pattern is a combination of any of states of the respective switching elements 51a to 51f, including a state (seventh state) of maintaining the continuously on state ("ON"), i.e., "ON" (first state), a state changed from being continuously turned off ("OFF") (period other than "ON" or "PWM"), i.e., "OFF" (second state), to "P2" (ninth state), and a state changed from being controlled to be turned "on" or "off" at a specific cycle (PWM-controlled state) ("PWM"), i.e., "PWM" (third state), to "P1" (eighth state). Each of the stages 1 to 6 is further divided into three sections including a section A", a section B", and a section C". An energization pattern is set individually for each of the section A", the section B", and the section C". The period (electrical angle) of each of the section A", the section B", and the section C" changes according to the value of the advance angle and the value of the energization angle. Herein, in FIG. 6, the "P1" state is labeled as "PWM phase (Instruction Duty)", and the "P2" state is labeled as "PWM phase (1/2 Duty)".

For example, in the stage 1 defined between the Hall edge HE1 and the Hall edge HE2, the energization pattern of the section A" is a combination of the states of the switching elements 51a to 51f being "1", "0", "P1", "P1", "P2", and "P2", respectively. Further, the energization pattern of the section B" is a combination of the states of the switching elements 51a to 51f being "1", "0", "P1", "P1", "1", and "0", respectively. Further, the energization pattern of the section C" is a combination of the states of the switching elements 51a to 51f being "P2", "P2", "P1", "P1", "1", and "0", respectively. Further, FIG. 7 is a table summarizing an example of the non-free energization patterns of the second method shown in FIG. 6. The ROM (not shown) in the control part 40 stores the non-free energization patterns in a format as shown in FIG. 7, for example. In FIG. 7, "P1" represents the eighth state in which PWM control is performed according to a PWM signal with the instruction duty ratio inputted from outside, "P2" represents the ninth state in which PWM control is performed according to a PWM signal with a duty ratio that is one half of the instruction duty ratio, "1" represents "ON", and "0" represents "OFF". Thus, in the non-free driving mode (second method), the driving control part 43 controls conduction (energization) of the switching elements 51*a* to 51*f* according to the non-free energization patterns above.

As described above, the rectangular wave driving mode is a driving mode of the rectangular wave driving method and is a driving mode of an output higher than the non-free driving mode. Further, the non-free driving mode is a driving mode of the non-free driving method which outputs a driving signal of an intermediate power by PWM control for an open period of a non-energized phase among driving signal lines of a plurality of phases driving the motor 2, and the non-free driving mode is a driving mode of an output lower than the rectangular wave driving mode. Herein, the driving signal of the intermediate power is a PWM signal with an intermediate duty ratio between the PWM signal with the maximum duty ratio and the PWM signal with the minimum duty ratio (first method), or a PWM signal with a duty ratio that is one half of the instruction duty ratio inputted from outside (second method).

Returning to the description of FIG. 1, the driving control part 43 performs control of switching between the non-free driving mode and the rectangular wave driving mode based on the vehicle speed detected by the vehicle speed detection part 42. The driving control part 43 switches from the non-free driving mode to the rectangular wave driving mode in the case where the vehicle speed becomes equal to or greater than a predetermined rectangular wave threshold Vth1 (equal to or greater than a first threshold). Further, the driving control part 43 switches from the rectangular wave driving mode to the non-free driving mode in the case where the vehicle speed becomes equal to or less than a non-free threshold Vth2 (equal to or less than a second threshold) lower than the rectangular wave threshold Vth1 (first threshold). Herein, referring to FIG. 8, the rectangular wave threshold Vth1 and the non-free threshold Vth2 will be described.

Figure 8:
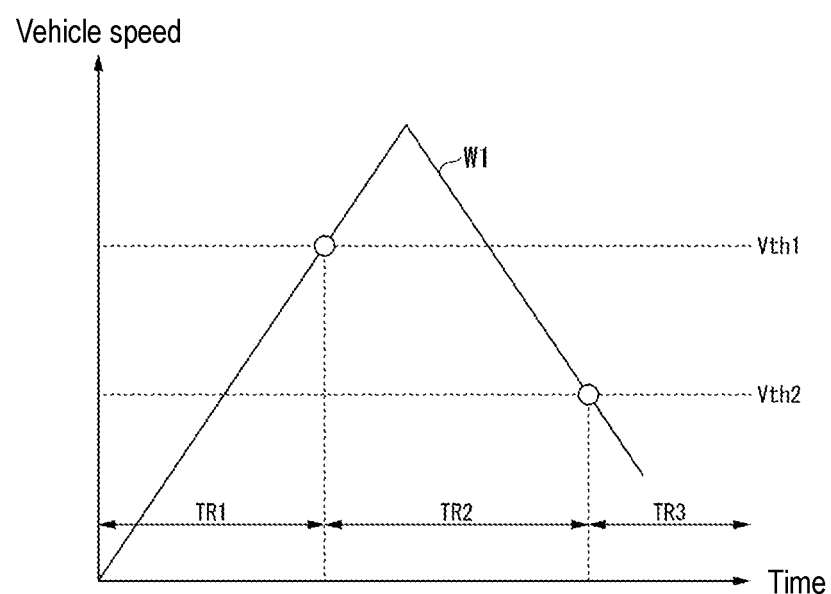
FIG. 8 is a diagram showing an example of a switching operation of a driving mode of a motor control device according to this embodiment.

FIG. 8 is a diagram showing an example of a switching operation of the driving mode of the motor control device 150 according to this embodiment. In FIG. 8, the horizontal axis represents time, and the vertical axis represents the vehicle speed. Further, a waveform W1 shows an example of a change in the vehicle speed over time. Further, a period TR1 and a period TR3 represent periods of the non-free driving mode, and a period TR2 represents a period of the rectangular wave driving mode.

As shown in FIG. 8, when the vehicle speed increases and becomes equal to or greater than the rectangular wave threshold Vth1, the driving control part 43 switches from the non-free driving mode to the rectangular wave driving mode. Further, when the vehicle speed decreases and becomes equal to or less than the non-free threshold Vth2, the driving control part 43 switches from the rectangular wave driving mode to the non-free driving mode. Herein, the rectangular wave threshold Vth1 is a value in a range of 1.1 times to 6.6 times the non-free threshold Vth2.

Figure 9:
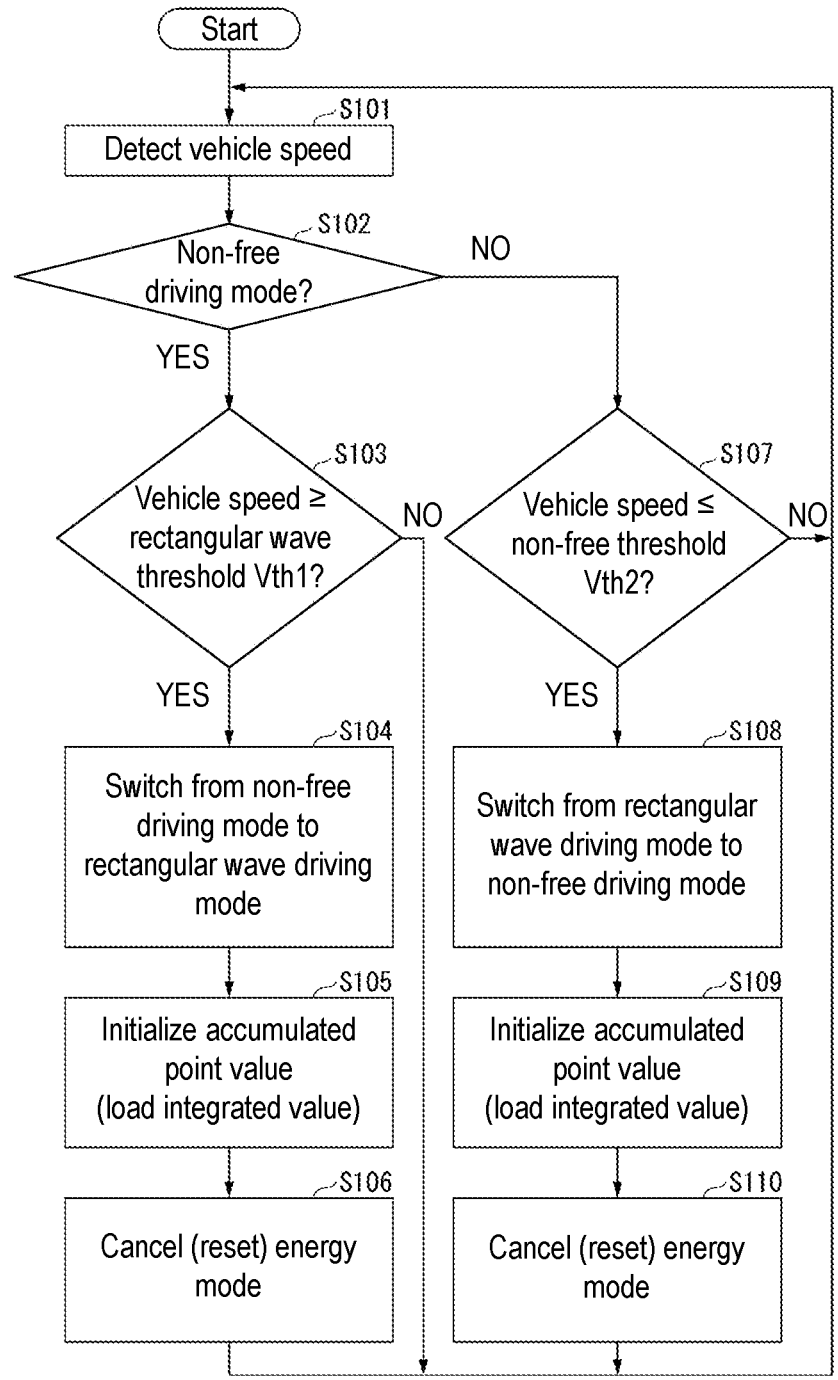
FIG. 9 is a flowchart showing an example of the switching operation of the driving mode of the motor control device according to this embodiment.

Next, an operation of the motor control device 150 according to this embodiment will be described with reference to the drawings. FIG. 9 is a flowchart showing an example of the switching operation of the driving mode of the motor control device 150 according to this embodiment.

As shown in FIG. 9, first, the control part 40 of the motor control device 150 detects a vehicle speed (step S101). The vehicle speed detection part 42 of the control part 40 detects the vehicle speed based on a vehicle speed signal outputted from the ECU 4.

Next, the driving control part 43 of the control part 40 determines whether the driving mode of the motor 2 is the non-free driving mode (step S102). In the case where the driving mode is the non-free driving mode (step S102: YES), the driving control part 43 proceeds to step S103. In the case where the driving mode is not the non-free driving mode (step S102: NO), the driving control part 43 proceeds to step S107.

In step S103, the driving control part 43 determines whether the vehicle speed is equal to or greater than a rectangular wave threshold Vth1 (vehicle speed ≥rectangular wave threshold Vth1). In the case where the vehicle speed is equal to or greater than the rectangular wave threshold Vth1 (step S103: YES), the driving control part 43 proceeds to step S104. In the case where the vehicle speed is less than the rectangular wave threshold Vth1 (step S103: NO), the driving control part 43 returns to step S101.

In step S104, the driving control part 43 switches from the non-free driving mode to the rectangular wave driving mode. Next, the driving control part 43 initializes an accumulated point value (load integrated value) (step S105). The driving control part 43 initializes (resets to "0") the load integrated value generated by the load integrated value generation part 41.

Next, the driving control part 43 cancels an energy mode (step S106). Herein, the energy mode is a protection mode that restricts the output in the case where the load integrated value becomes very large (in the case where the load increases). After the process in step S106, the driving control part 43 returns to step S101.

Further, in step S107, the driving control part 43 determines whether the vehicle speed is equal to or less than a non-free threshold Vth2 (vehicle speed ≤non-free threshold Vth2). In the case where the vehicle speed is equal to or less than the non-free threshold Vth2 (step S107: YES), the driving control part 43 proceeds to step S108. In the case where the vehicle speed is greater than the non-free threshold Vth2 (step S107: NO), the driving control part 43 returns to step S101.

In step S108, the driving control part 43 switches from the rectangular wave driving mode to the non-free driving mode. Next, the driving control part 43 initializes an accumulated point value (load integrated value) (step S109). The driving control part 43 initializes (resets to "0") a load integrated value generated by the load integrated value generation part 41.

Next, the driving control part 43 cancels the energy mode (step S110). After the process in step S110, the driving control part 43 returns to step S101.

Figure 10:
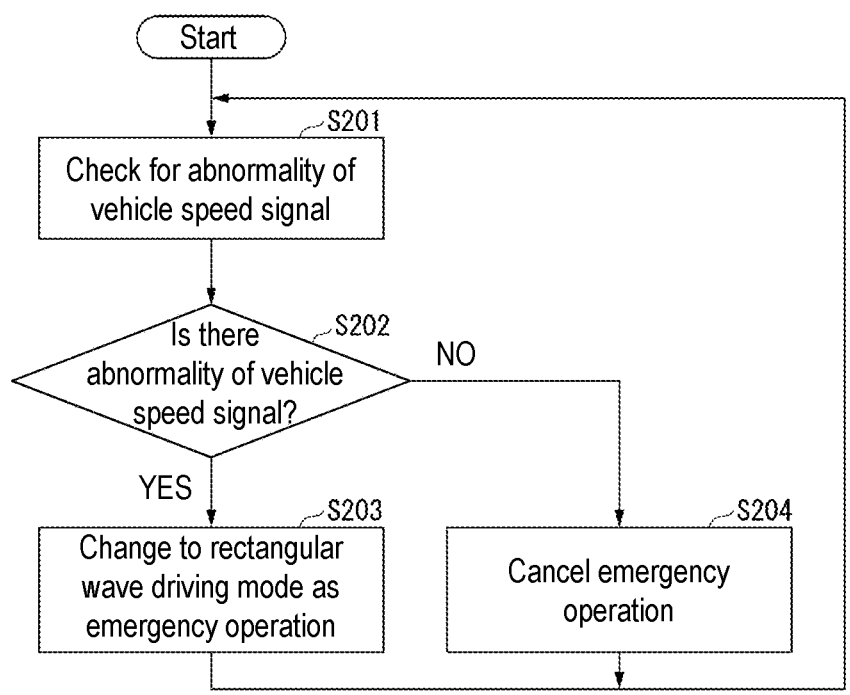
FIG. 10 is a flowchart showing another example of the switching operation of the driving mode of the motor control device according to this embodiment.

Further, referring to FIG. 10, a switching operation of the driving mode in the case where the vehicle speed signal cannot be detected will be described. FIG. 10 is a flowchart showing another example of the switching operation of the driving mode of the motor control device 150 according to this embodiment.

As shown in FIG. 10, first, the driving control part 43 of the motor control device 150 checks for an abnormality of a vehicle speed signal (step S201). Next, the driving control part 43 determines whether there is an abnormality of the vehicle speed signal (step S202). That is, the driving control part 43 determines whether the vehicle speed can be detected normally. In the case where there is an abnormality of the vehicle speed signal (the vehicle speed cannot be detected) (step S202: YES), the driving control part 43 proceeds to step S203. In the case where there is no abnormality of the vehicle speed signal (step S202: NO), the driving control part 43 proceeds to step S204.

In step S203, the driving control part 43 changes to the rectangular wave driving mode as an emergency operation. After the process in step S203, the driving control part 43 returns to step S201.

Further, in step S204, the driving control part 43 cancels the emergency operation. After the process in step S204, the driving control part 43 returns to step S201.

Figure 11:
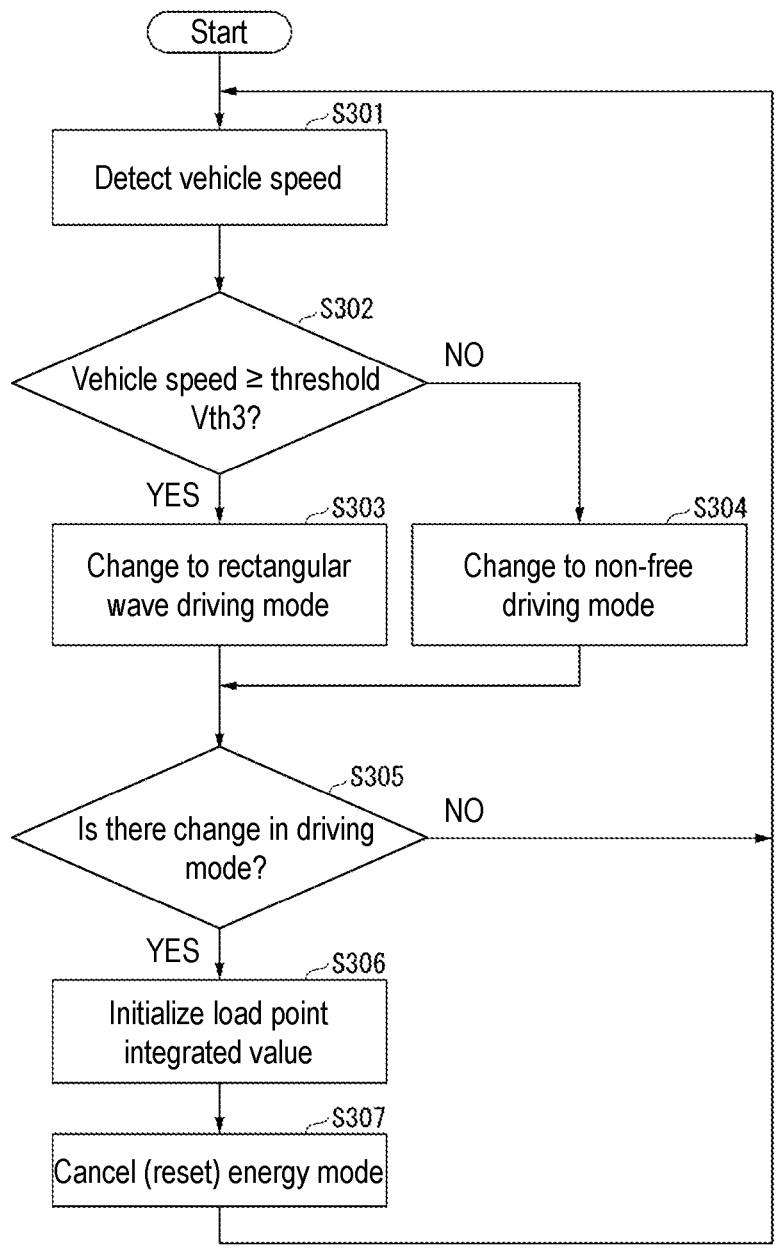
FIG. 11 is a flowchart showing a modification example of the switching operation of the driving mode of the motor control device according to this embodiment.

Next, referring to FIG. 11, a modification example of the switching operation of the driving mode of the motor control device 150 according to this embodiment will be described. FIG. 11 is a flowchart showing a modification example of the switching operation of the driving mode of the motor control device according to this embodiment. Herein, a modification example in which, of the thresholds of the vehicle speed described above, the rectangular wave threshold Vth1 and the non-free threshold Vth2 are equal values will be described.

As shown in FIG. 11, first, the control part 40 of the motor control device 150 detects a vehicle speed (step S301). The vehicle speed detection part 42 of the control part 40 detects the vehicle speed based on a vehicle speed signal outputted from the ECU 4.

Next, the driving control part 43 of the control part 40 determines whether the vehicle speed is equal to or greater than a threshold Vth3 (vehicle speed ≥threshold Vth3) (step S302). In the case where the vehicle speed is equal to or greater than the threshold Vth3 (step S302: YES), the driving control part 43 proceeds to step S303. In the case where the vehicle speed is less than the threshold Vth3 (step S302: NO), the driving control part 43 proceeds to step S304.

In step S303, the driving control part 43 changes to the rectangular wave driving mode. After the process in step S303, the driving control part 43 proceeds to step S305. Further, in step S304, the driving control part 43 changes to the non-free driving mode. After the process in step S304, the driving control part 43 proceeds to step S305.

In step S305, the driving control part 43 determines whether the driving mode has been changed. In the case where the driving mode has been changed (step S305: YES), the driving control part 43 proceeds to step S306. In the case where the driving mode has not been changed (step S305: NO), the driving control part 43 returns to step S301.

In step S306, the driving control part 43 initializes an accumulated point value (load integrated value). The driving control part 43 initializes (resets to "0") the load integrated value generated by the load integrated value generation part 41.

Next, the driving control part 43 cancels the energy mode (step S307). After the process in step S307, the driving control part 43 returns to step S301.

As described above, the driving control part 43 may switch to the rectangular wave driving mode in the case where the vehicle speed is equal to or greater than the predetermined threshold Vth3, and may switch to the non-free driving mode in the case where the vehicle speed is less than the threshold Vth3 (less than the predetermined threshold).

Figure 12:
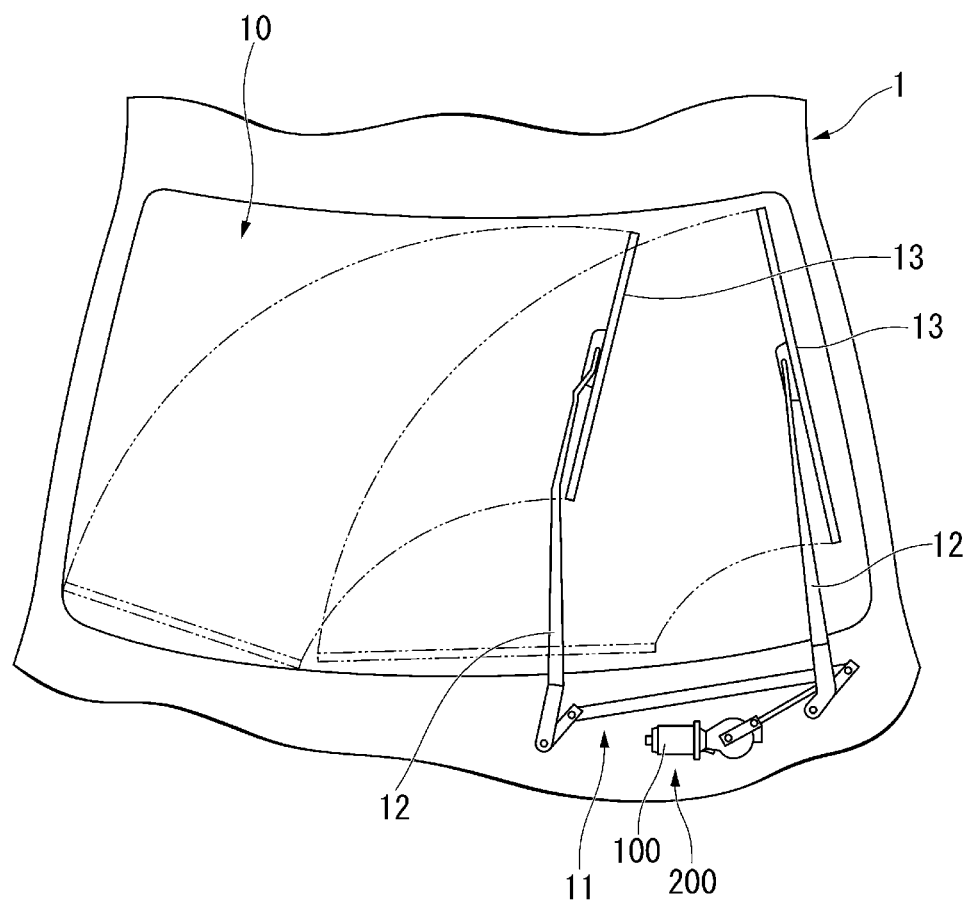
FIG. 12 is a configuration view showing an example of a wiper device according to this embodiment.

Next, referring to FIG. 12, an example of a case of applying the motor device 100 above to a wiper device will be described. FIG. 12 is a configuration view showing an example of a wiper device 200 according to this embodiment.

As shown in FIG. 12, the wiper device 200 performs a wiping operation on a window surface of a window glass 10 of a vehicle 1. The wiper device 200 includes a motor device 100, a link mechanism 11, two wiper arms 12, and wiper blades 13 mounted at tips of the respective wiper arms 12.

The motor device shown in FIG. 12 is the motor device 100 of this embodiment as described above, and detailed descriptions thereof will be omitted herein. The motor device 100 includes a motor 2 and a motor control device 150.

The wiper arm 12 operates on the window surface of the window glass 10 by the rotational driving of the motor device 100 and performs the wiping operation with the wiper blade 13 mounted at the tip. The two wiper arms 12 are connected by the link mechanism 11.

The wiper blade 13 is provided to be pressed against the window glass 10 by the wiper arm 12. The wiper blade 13 includes a blade rubber (not shown) that is held by a blade holder mounted at the tip of the wiper arm 12. Upon swinging of the wiper arm 12 by the motor device 100, the wiper blade 13 reciprocates over a wiping range on the outer surface of the window glass 10 and wipes the window glass 10 with the blade rubber (not shown).

As described above, a motor control device 150 according to this embodiment is a motor control device which controls a motor 2 having a rotor shaft 22a (output shaft) and includes a vehicle speed detection part 42 and a driving control part 43. The vehicle speed detection part 42 detects a vehicle speed, which is a traveling speed of a vehicle mounted with the motor 2. Based on the vehicle speed detected by the vehicle speed detection part 42, the driving control part 43 performs control of switching between a non-free driving mode (first driving mode) which drives the motor 2, and a rectangular wave driving mode (second driving mode) which is a high-output driving mode in which a minimum rotational speed at which the output shaft is capable of being rotationally driven by an inputted power is higher than in the non-free driving mode (first driving mode). Herein, the second driving mode is a high-output driving mode in which a number of revolutions and an output of the motor 2 are higher than in the first driving mode at the same load, power, and duty.

In the motor control device 150 according to this embodiment, for example, in the case of being applied to a wiper device 200, there is a tendency for the load of the motor 2 to increase as the vehicle speed increases. Thus, the motor control device 150 according to this embodiment can appropriately perform motor driving even in the case where a high load is generated from an initial stage of driving. That is, in the motor control device 150 according to this embodiment, for example, the wiping operation can be performed without stop even in initial wiping immediately after wiper actuation during vehicle traveling.

Further, since the motor control device 150 according to this embodiment can appropriately switch to the non-free driving mode (first driving mode) in the case where the vehicle is stopped, it is possible to quiet a driving sound (reduce motor operation sound).

Further, in this embodiment, the driving control part 43 switches from the non-free driving mode (first driving mode) to the rectangular wave driving mode (second driving mode) in the case where the vehicle speed becomes equal to or greater than a predetermined rectangular wave threshold Vth1 (equal to or greater than a first threshold). Further, the driving control part 43 switches from the rectangular wave driving mode (second driving mode) to the non-free driving mode (first driving mode) in the case where the vehicle speed becomes equal to or less than a non-free threshold Vth2 (equal to or less than a second threshold) lower than the rectangular wave threshold Vth1.

Accordingly, the motor control device 150 according to this embodiment switches to the rectangular wave driving mode (second driving mode) in the case where the vehicle speed is high (load is large), and switches to the non-free driving mode (first driving mode) in the case where the vehicle speed is low (load is small). Thus, it is possible to realize both reduction of the motor operation sound in the case of a small load and reliable motor driving in the case of a large load. Further, by using two thresholds including the rectangular wave threshold Vth1 and the non-free threshold Vth2, the motor control device 150 according to this embodiment can reduce a malfunction such as frequent switching of the driving mode due to noise, for example.

Further, in this embodiment, the rectangular wave threshold Vth1 is a value in a range of 1.1 times to 6.6 times the non-free threshold Vth2. Thus, the motor control device 150 according to this embodiment can appropriately respond to even a vehicle such as an automobile traveling at a high speed of 200 km/h or more.

Further, in this embodiment, the second driving mode is a driving mode of a rectangular wave driving method (rectangular wave driving mode), and the first driving mode is a driving mode of a non-free driving method (non-free driving mode). The driving mode of the non-free driving method (non-free driving mode) is a mode that outputs a driving signal of an intermediate power by PWM control for an open period (free period) of a non-energized phase among driving signal lines of a plurality of phases driving the motor 2. The driving control part 43 switches from the non-free driving mode to the rectangular wave driving mode in the case where the vehicle speed becomes equal to or greater than the rectangular wave threshold Vth1. Further, the driving control part 43 switches from the rectangular wave driving mode to the non-free driving mode in the case where the vehicle speed becomes equal to or less than the non-free threshold Vth2. Thus, the motor control device 150 according to this embodiment can appropriately switch the driving mode between the rectangular wave driving mode and the non-free driving mode according to the vehicle speed.

Further, in this embodiment, the driving signal of the intermediate power is a PWM signal with an intermediate duty ratio between a PWM signal with a maximum duty ratio and a PWM signal with a minimum duty ratio (first method), or is a PWM signal with a duty ratio that is one half of an instruction duty ratio inputted from outside (second method). Thus, the motor control device 150 according to this embodiment can appropriately perform motor driving by the non-free driving mode.

Further, in this embodiment, the motor 2 is a brushless motor having windings (21u, 21v, 21w) of three phases. The driving control part 43 controls conduction of a plurality of switching elements 51a to 51f included in an inverter 50, which generates driving signals of three phases, by switching between the non-free driving mode (first driving mode) and the rectangular wave driving mode (second driving mode). Thus, the motor control device 150 according to this embodiment can perform more appropriate motor driving on the brushless motor.

Further, in this embodiment, the driving control part 43 may switch to the rectangular wave driving mode (second driving mode) in the case where the vehicle speed is equal to or greater than a predetermined threshold Vth3, and switch to the non-free driving mode (first driving mode) in the case where the vehicle speed is less than the threshold Vth3. Thus, the motor control device 150 according to this embodiment can realize both reduction in the motor operation sound in the case of a small load and reliable motor driving in the case of a large load.

Further, in this embodiment, the driving control part 43 initializes (sets to "0") an accumulated point value (load integrated value) in the case where the operation mode is switched. Thus, the motor control device 150 according to this embodiment can reduce occurrence of an error in the accumulated point value (load integrated value) and occurrence of a malfunction when switching the driving mode.

Further, in this embodiment, the driving control part 43 cancels an energy mode, which is a protection mode that restricts the output when the accumulated point value (load integrated value) becomes very large (when the load increases), in the case where the operation mode is switched. Thus, the motor control device 150 according to this embodiment can reduce occurrence of a malfunction due to the protection mode when switching the driving mode.

Further, in this embodiment, the driving control part 43 switches to the rectangular wave driving mode (second driving mode) as an emergency operation in the case where the vehicle speed cannot be detected. Thus, the motor control device 150 according to this embodiment can reliably perform motor driving by switching to the rectangular wave driving mode (second driving mode) in the event of an abnormality.

Further, a motor device 100 according to this embodiment includes the motor 2 and the motor control device 150 described above. Thus, the motor device 100 according to this embodiment achieves the same effects as the motor control device 150, and can appropriately perform motor driving even in the case where a high load is generated from an initial stage of motor driving.

Further, a wiper device 200 according to this embodiment includes the motor 2 and the motor control device 150 described above. The motor control device 150 causes a wiper member (wiper arm 12 and wiper blade 13) to perform a wiping operation on a window surface using the motor 2.

Thus, the wiper device 200 according to this embodiment achieves the same effects as the motor device 100 described above, and can appropriately perform motor driving even in the case where a high load is generated from the initial stage of motor driving.

Further, a motor control method according to this embodiment is a motor control method which controls a motor 2 having a rotor shaft 22a and includes a vehicle speed detection step and a driving control step. In the vehicle speed detection step, a vehicle speed detection part 42 detects a vehicle speed, which is a traveling speed of a vehicle mounted with the motor 2. In the driving control step, based on the vehicle speed detected in the vehicle speed detection step, a driving control part 43 performs control of switching between a non-free driving mode (first driving mode) which drives the motor 2, and a rectangular wave driving mode (second driving mode). The rectangular wave driving mode (second driving mode) is a high-output driving mode in which a minimum rotational speed at which the rotor shaft 22a is capable of being rotationally driven by an inputted power is higher than in the non-free driving mode (first driving mode).

Thus, the motor control method according to this embodiment achieves the same effects as the motor device 100 described above, and can appropriately perform motor driving even in the case where a high load is generated from the initial stage of motor driving.

In addition, the disclosure is not limited to the embodiments above and may be modified within a scope without departing from the spirit of the disclosure. For example, the embodiments above have described an example in which the motor control device 150 switches the driving mode according to the vehicle speed. However, the disclosure is not limited thereto, and the vehicle speed and the accumulated point value (load integrated value) may be combined to switch the driving mode.

Further, the embodiments above have described an example of switching between the non-free driving mode (first driving mode) and the rectangular wave driving mode (second driving mode), but the disclosure is not limited thereto, and other driving modes may also be switched.

Further, the embodiments above have described an example in which the motor device 100 is used in the wiper device 200, but the disclosure is not limited thereto, and the motor device 100 may also be used for other purposes.

In addition, each configuration included in the motor device 100 described above has a computer system therein. Then, a program for realizing the function of each configuration included in the motor device 100 described above may be recorded on a computer-readable recording medium, and by loading and executing the program recorded on this recording medium into the computer system, the process of each configuration included in the motor device 100 described above may be performed. Herein, "loading and executing a program recorded on a recording medium into a computer system" includes installing the program into the computer system. The term "computer system" as used herein includes an OS and hardware such as peripheral devices. Further, the "computer system" may include a plurality of computer devices connected via a network including a communication line such as the Internet, a WAN, a LAN, and a dedicated line. The "computer-readable recording medium" refers to a portable medium such as a flexible disk, a magneto-optical disk, a ROM, and a CD-ROM, or a storage device such as a hard disk built in a computer system. As described above, the recording medium on which the program is stored may also be a non-transitory recording medium such as a CD-ROM.

Further, a part or all of the above functions may be realized as an integrated circuit such as a large scale integration (LSI). Each of the above functions may be individually configured into a processor, or a part or all of them may be integrated and configured into a processor. Further, the method of configuration into an integrated circuit is not limited to the LSI, but may also be realized by a dedicated circuit or a general-purpose processor. Further, when an integrated circuit configuration technology which replaces the LSI appears due to advances in semiconductor technology, an integrated circuit based on this technology may be used.

What is claimed is:

1. A motor control device which controls a motor having an output shaft, the motor control device comprising:
   a processor configured to:
   detect a vehicle speed, which is a traveling speed of a vehicle mounted with the motor;
   based on the vehicle speed detected perform control of switching between a first driving mode which drives the motor, and a second driving mode in which a number of revolutions of the output shaft and an output of the motor are higher than in the first driving mode;
   switch from the first driving mode to the second driving mode in a case where the vehicle speed becomes equal to or greater than a predetermined first threshold; and
   switch from the second driving mode to the first driving mode in a case where the vehicle speed becomes equal to or less than a second threshold lower than the first threshold;
   wherein the second driving mode is a driving mode of a rectangular wave driving method,
   the first driving mode is a driving mode of a non-free driving method that outputs a driving signal of an intermediate power by pulse width modulation control for an open period of a non-energized phase among driving signal lines of a plurality of phases driving the motor,
   the processor is configured to switch from the driving mode of the non-free driving method to the driving mode of the rectangular wave driving method in a case where the vehicle speed becomes equal to or greater than the first threshold, and
   the processor is configured to switch from the driving mode of the rectangular wave driving method to the driving mode of the non-free driving method in a case where the vehicle speed becomes equal to or less than the second threshold.

2. The motor control device according to claim 1, wherein the first threshold is a value in a range of 1.1 times to 6.6 times the second threshold.

3. The motor control device according to claim 1, wherein the driving signal of the intermediate power is a pulse width modulation signal with an intermediate duty ratio between a pulse width modulation signal with a maximum duty ratio and a pulse width modulation signal with a minimum duty ratio, or is a pulse width modulation signal with a duty ratio that is one half of an instruction duty ratio inputted from outside.

4. The motor control device according to claim 1, wherein the motor is a brushless motor having windings of three phases, and
   the processor is further configured to control conduction of a plurality of switching elements included in an inverter, which generates driving signals of three phases, by switching between the first driving mode and the second driving mode.

5. A motor device comprising:
   the motor control device according to claim 1; and
   the motor.

6. A wiper device comprising:
   the motor control device according to claim 1; and
   the motor, wherein
   the motor control device causes a wiper member to perform a wiping operation on a window surface using the motor.

7. A motor control method which controls a motor having an output shaft, the motor control method comprising:
   detecting a vehicle speed, which is a traveling speed of a vehicle mounted with the motor;
   based on the vehicle speed detected performing control of switching between a first driving mode which drives the motor, and a second driving mode in which a number of revolutions of the output shaft and an output of the motor are higher than in the first driving mode;
   switching from the first driving mode to the second driving mode in a case where the vehicle speed becomes equal to or greater than a predetermined first threshold, and
   switching from the second driving mode to the first driving mode in a case where the vehicle speed becomes equal to or less than a second threshold lower than the first threshold;

wherein the second driving mode is a driving mode of a rectangular wave driving method, the first driving mode is a driving mode of a non-free driving method that outputs a driving signal of an intermediate power by pulse width modulation control for an open period of a non-energized phase among driving signal lines of a plurality of phases driving the motor, the processor is configured to switch from the driving mode of the non-free driving method to the driving mode of the rectangular wave driving method in a case where the vehicle speed becomes equal to or greater than the first threshold, and the processor is configured to switch from the driving mode of the rectangular wave driving method to the driving mode of the non-free driving method in a case where the vehicle speed becomes equal to or less than the second threshold.

* * * * *